United States Patent
Harper et al.

(10) Patent No.: US 10,137,816 B2
(45) Date of Patent: Nov. 27, 2018

(54) VEHICLE SYSTEMS AND METHODS TO SUPPORT THE DISTRIBUTION OF PRODUCTS

(71) Applicant: Walmart Apollo, LLC, Bentonville, AR (US)

(72) Inventors: Thomas L. Harper, Bentonville, AR (US); William R. Allen, Pea Bridge, AR (US); Richard M. Blair, II, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/421,673

(22) Filed: Feb. 1, 2017

(65) Prior Publication Data
US 2017/0225902 A1 Aug. 10, 2017

Related U.S. Application Data

(60) Provisional application No. 62/291,097, filed on Feb. 4, 2016.

(51) Int. Cl.
*B65G 43/08* (2006.01)
*B65G 21/14* (2006.01)
(Continued)

(52) U.S. Cl.
CPC .............. *B60P 1/36* (2013.01); *G06Q 10/087* (2013.01); *G06Q 10/0833* (2013.01); *G06Q 10/08355* (2013.01); *B65G 67/20* (2013.01)

(58) Field of Classification Search
CPC ........ B65G 67/20; B65G 67/02; B65G 43/08; B65G 69/24; B60P 1/36; B65D 90/125;
(Continued)

(56) References Cited

U.S. PATENT DOCUMENTS 3,767,067 A * 10/1973 Mickey ..................... B60P 1/36
  414/513
3,777,916 A * 12/1973 Lutz ......................... B60P 1/36
  198/774.4
(Continued)

FOREIGN PATENT DOCUMENTS

WO 2015066723 5/2015

OTHER PUBLICATIONS

Bartholdi, John J.; Reducing Labor Costs in an LTL Crossdocking Terminal; vol. 48—Issue No. 6; Operations Research; Nov.-Dec. 2000; pp. 823-832.
(Continued)

*Primary Examiner* — Kaitlin S Joerger
(74) *Attorney, Agent, or Firm* — Fitch, Even, Tabin & Flannery LLP

(57) ABSTRACT

Some embodiments provide vehicle systems comprising: a housing; a wheel system comprising at least one axle extending between at least two wheels positioned on opposite sides of the housing and supporting the housing; a mobile product distribution system comprising: a product movement system maintained within the housing; and multiple bay doors formed in the housing and with which inbound vehicles and outbound vehicles align while products are distributed from each of the inbound vehicles to at least one of the outbound vehicles; wherein the product movement system extends between the multiple bay doors and is configured to transport the products from each of the inbound vehicles, through the housing and to at least one of the outbound vehicles.

15 Claims, 7 Drawing Sheets

(51) Int. Cl.
*B60P 1/36* (2006.01)
*G06Q 10/08* (2012.01)
*B65G 67/20* (2006.01)

(58) Field of Classification Search
CPC ......... G06G 10/08355; G06G 10/0833; G06G 10/0837
USPC ........................................................ 414/523
See application file for complete search history.

(56) References Cited

U.S. PATENT DOCUMENTS

| | | | | | |
|---|---|---|---|---|---|
| 3,904,022 | A | * | 9/1975 | Lutz | B60P 1/36 198/580 |
| 5,511,923 | A | | 4/1996 | Dunstan | |
| 5,645,390 | A | * | 7/1997 | Filiberti | B60P 1/38 15/3 |
| 5,794,416 | A | * | 8/1998 | Rahman | B65G 67/20 53/157 |
| 6,698,655 | B2 | * | 3/2004 | Kondo | G06Q 10/08 235/375 |
| 7,454,811 | B1 | * | 11/2008 | Stotka | B65G 69/30 14/69.5 |
| 7,587,345 | B2 | | 9/2009 | Mann | |
| 7,742,745 | B2 | * | 6/2010 | Twitchell, Jr. | G06Q 10/08 455/41.2 |
| 7,778,773 | B2 | | 8/2010 | Yaqub | |
| 8,156,872 | B2 | * | 4/2012 | Hathaway | B61D 47/005 104/27 |
| 8,562,277 | B2 | * | 10/2013 | Criswell | B65G 67/08 414/398 |
| 8,639,591 | B1 | | 1/2014 | Mishra | |
| 8,690,511 | B2 | | 4/2014 | Lanigan | |
| 8,702,366 | B2 | * | 4/2014 | Campbell | B65G 63/002 414/343 |
| 8,712,871 | B2 | | 4/2014 | Brockman | |
| 8,942,884 | B2 | * | 1/2015 | Gibbs | B65G 67/20 701/31.4 |
| 9,367,827 | B1 | * | 6/2016 | Lively | G06F 17/30312 |
| 9,457,970 | B1 | * | 10/2016 | Zevenbergen | B65G 67/02 |
| 9,567,168 | B1 | * | 2/2017 | Tibbens | B65G 63/002 |
| 9,623,569 | B2 | * | 4/2017 | McCollum | B25J 9/0093 |
| 9,688,489 | B1 | * | 6/2017 | Zevenbergen | B65G 67/20 |
| 2002/0010661 | A1 | | 1/2002 | Waddington | |
| 2003/0078802 | A1 | | 4/2003 | Yonezawa | |
| 2004/0064385 | A1 | * | 4/2004 | Tamaki | G06Q 10/06 705/29 |
| 2004/0236635 | A1 | | 11/2004 | Publicover | |
| 2005/0288986 | A1 | | 12/2005 | Barts | |
| 2007/0160449 | A1 | * | 7/2007 | Girn | B65G 67/02 414/390 |
| 2011/0172875 | A1 | | 7/2011 | Gibbs | |
| 2012/0207572 | A1 | * | 8/2012 | Enenkel | B65G 67/08 414/502 |
| 2013/0018696 | A1 | | 1/2013 | Meldrum | |
| 2013/0124430 | A1 | | 5/2013 | Moir | |
| 2014/0205403 | A1 | * | 7/2014 | Criswell | B25J 5/007 414/395 |
| 2015/0269520 | A1 | * | 9/2015 | Knapp | G06Q 10/08355 705/338 |
| 2015/0352721 | A1 | * | 12/2015 | Wicks | B25J 9/1664 700/228 |
| 2017/0137235 | A1 | * | 5/2017 | Thompson | B65G 54/02 |
| 2017/0225902 | A1 | * | 8/2017 | Harper | B60P 1/36 |
| 2017/0286908 | A1 | * | 10/2017 | Lively | G06F 17/30312 |

OTHER PUBLICATIONS

Intermec Technologies Corporation; Direct Store Delivery; Deployment Environment Guide; Intermec Technologies Corporation; Jan. 2012; 18 pages.

MWPVL International Inc.; "Direct Store Delivery Versus Centralized Distribution"; http://www.mwpvl.com/html/dsd_vs_central_distribution.html; Sep. 16, 2015; 5 pages.

PCT; App. No. PCT/US2017/015940; International Search Report and Written Opinion dated Apr. 18, 2017.

SAP; Direct Store Delivery for Consumer Products Companies; SAP Direct Store Delivery; SAP AG; 2013; 7 pages.

* cited by examiner

VEHICLE SYSTEMS AND METHODS TO SUPPORT THE DISTRIBUTION OF PRODUCTS

CROSS-REFERENCE TO RELATED APPLICATION

This application claims the benefit of U.S. Provisional Application No. 62/291,097, filed Feb. 4, 2016, which is incorporated herein by reference in its entirety.

TECHNICAL FIELD

This invention relates generally to vehicle systems and methods.

BACKGROUND

In a modern retail environment, there is a need to improve the customer service and/or convenience for the customer. One aspect of customer service is the availability of products. The availability of products is dependent in part on the distribution of products. There are numerous ways to distribute and deliver products. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining vehicle systems and methods to support the distribution of products. This description includes drawings, wherein.

Figure 1:
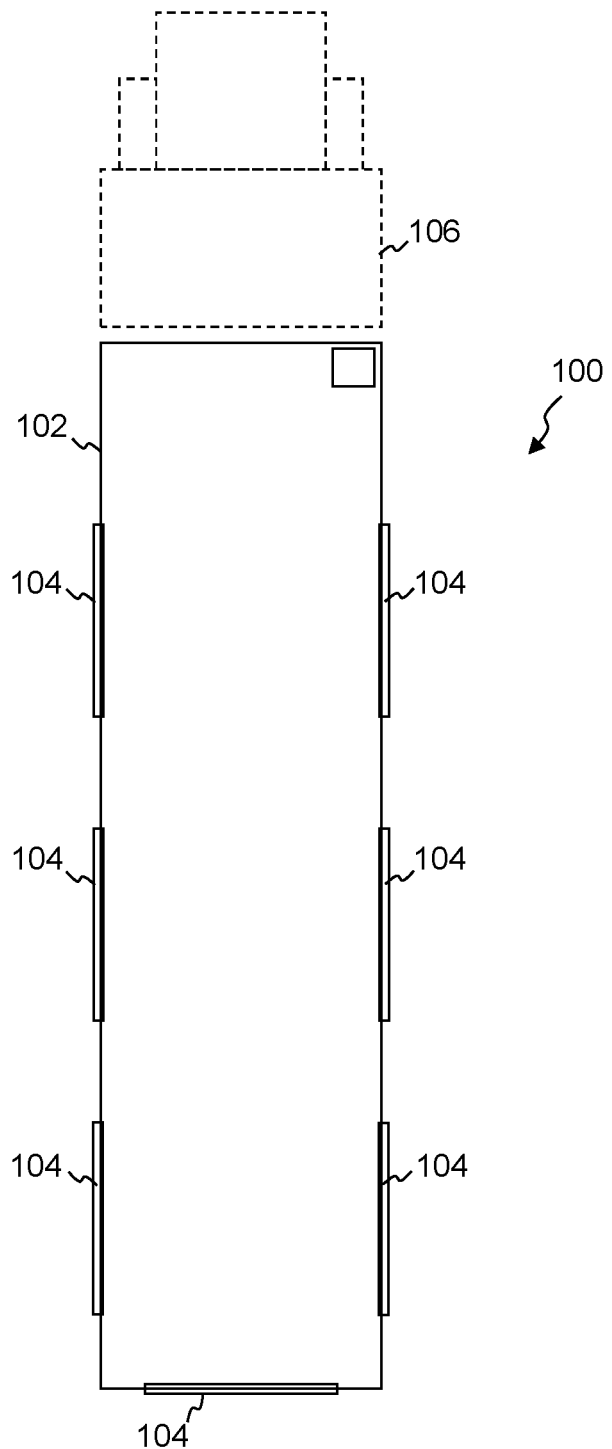
FIG. 1 illustrates a simplified, block diagram of an overhead view of an exemplary vehicle system comprising a mobile product distribution system (MPDS), in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to provide vehicle systems and methods to support the distribution of products. Some embodiments enable the transportation of a mobile product distribution system (MPDS) to a mobile distribution location to enable products to be distribution through the mobile product distribution system and between vehicles. In some embodiments, a system to distribute products includes one or more mobile product distribution systems that can each be transported to different temporary distribution locations. The MPDS is configured to allow inbound vehicles and outbound vehicles to cooperate with the mobile distribution system to enable products to be transferred from one or more inbound vehicles to one or more outbound vehicles. Inbound vehicles can be substantially any relevant vehicle that carries products from a source location to at least the MPDS. Outbound vehicles can similarly be substantially any relevant vehicle that receives one or more products through the MPDS and from an inbound vehicle, and transports the one or more products to a second location, which may be an intended location (e.g., a retail facility location where the product can be sold to a customer, to a customer's address, etc.). In some instances, an inbound vehicle can also be an outbound vehicle when the inbound vehicle receives one or more products through the MPDS.

In some implementations, a MPDS has a housing and one or more wheel systems that comprise at least one axle extending between at least two wheels positioned on opposite sides of the housing and supporting the housing. A product movement system is typically maintained within the housing. Further, the MPDS further includes multiple bay doors, movable panels or the like that are formed in the housing. The bay doors are positioned so that inbound and outbound vehicles can each align with one of the bay doors and products can be distributed from one or more inbound vehicles to one or more outbound vehicles. In some embodiments the product movement system extends between at least two of the multiple bay doors and is configured transport the products from one or more inbound vehicles, through the housing, and to at least one outbound vehicle.

Figure 2:
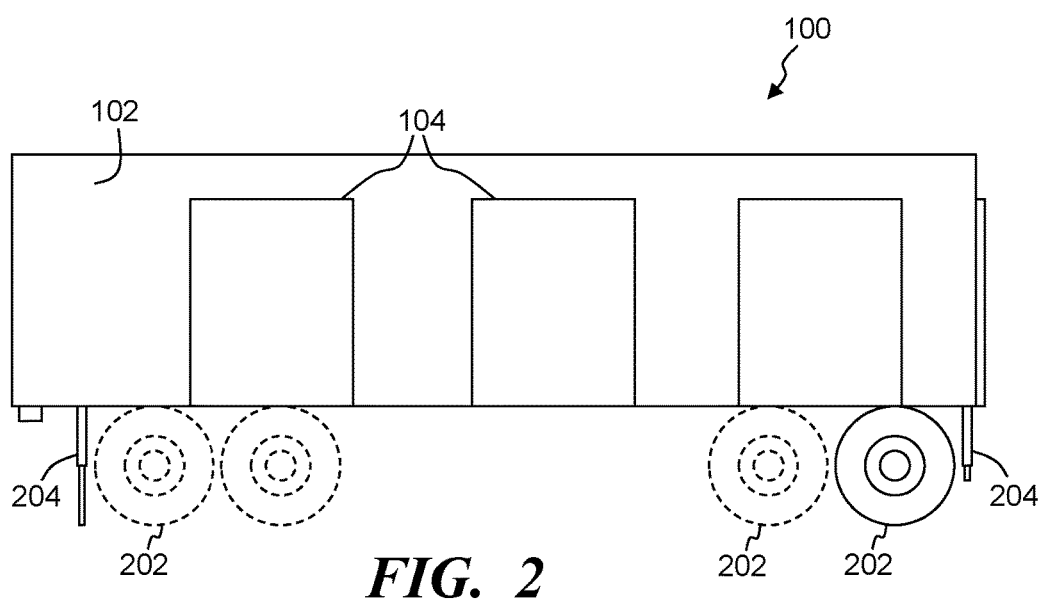
FIG. 2 illustrates a side view of the exemplary MPDS, in accordance with some embodiments.

FIG. 1 illustrates a simplified, block diagram of an overhead view of an exemplary vehicle system comprising a mobile product distribution system (MPDS) 100, in accordance with some embodiments. FIG. 2 illustrates a side view of the exemplary MPDS 100, in accordance with some embodiments. Referring to FIGS. 1-2, the MPDS includes the housing 102. The housing can be constructed of substantially any relevant material that can withstand traveling on roads, freeways, highways and the like. For example, the housing can be constructed partially or fully from metal, corrugated metal, wood, plastic, canvas, other such materials, or combination of two or more of such materials. In some instances, the housing may include insulation, windows for lighting, panels through which light can enter, retractable panels, and/or other features. The MPDS further includes a transport system that allows the MPDS to be transported between temporary distribution locations. In some embodiments, the transport system includes a wheel system that includes one or more axles each extending between at least two wheels 202 positioned on opposite sides of the housing and supporting the housing. Typically, one or more springs, shocks, and/or other such system are cooperated with the axle.

In some embodiments, the MPDS includes a motor and operating controls (e.g., steering wheel, gas pedal, brake, gear control, etc.) with the motor cooperated with the axle through a drive train or other such method, to allow the MPDS to be self-propelled along roads in moving between temporary locations. In other implementations, the MPDS can optionally be removably cooperated with a towing tractor 106, rig or the like. The towing tractor 106 can pull the MPDS between different temporary distribution locations. Typically, a scheduling control circuit, which may be part of the MPDS or remote from the MPDS and in communication with multiple MPDSs, and determine temporarily distribution location schedules and communicate the temporarily location schedules to the MPDSs, workers of the MPDSs and/or corresponding towing tractors. The temporarily location schedules specifies each of one or more temporarily distribution locations and when an MPDS is to be at each of the one or more specified temporarily locations.

The MPDS 100 further includes multiple bay doors 104. The bay doors are formed in the housing and distributed about the housing. Inbound vehicles and outbound vehicles can be positioned relative to the MPDS to align with one of bay doors. In some implementations, at least two adjacent bay doors are positioned and spaced apart to allow two separate inbound and/or outbound vehicles to simultaneously align with adjacent doors.

Figure 3:
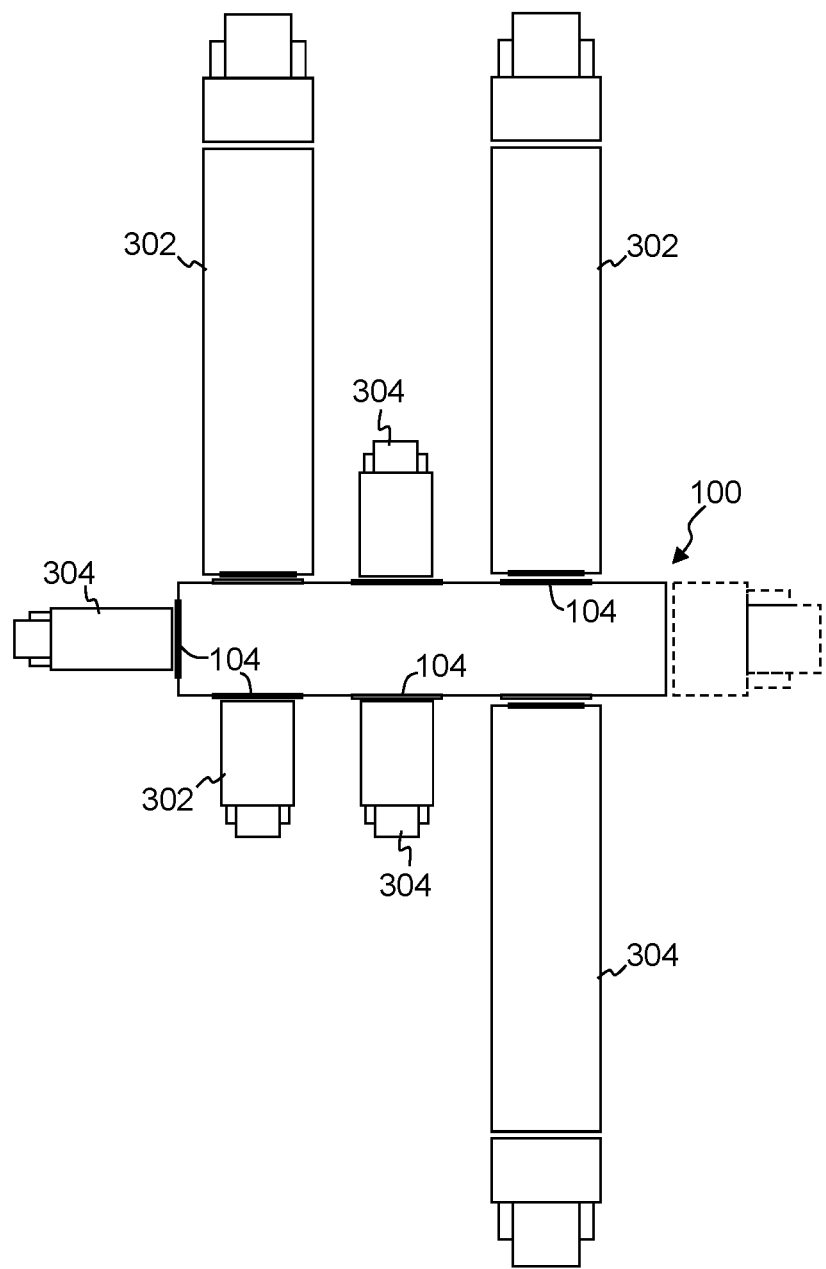
FIG. 3 illustrates an overhead view of a simplified, block diagram of an exemplary MPDS with multiple vehicles that are each backed up to and aligned with a different one of multiple bay doors, in accordance with some embodiments.

FIG. 3 illustrates an overhead view of a simplified, block diagram of an exemplary MPDS 100 with multiple vehicles (e.g., one or more inbound vehicles 302, and/or one or more outbound vehicles 304) that are each backed up to and aligned with a different one of the multiple bay doors 104, in accordance with some embodiments. In this example, the MPDS includes seven bay doors 104 that are spaced about the housing 102 to enable seven different vehicles to simultaneously align with and/or cooperate with one of the bay doors. Other configurations can be implemented depending on the size of the MPDS, the size of the inbound and/or outbound vehicles intended to cooperate with the MPDS, laws (e.g., vehicle codes), size and/or number of product movement systems to be utilized, size and/or quantities of products predicted to be distributed through the MPDS, desired number of vehicles that can simultaneously align with one of the bay doors, other such factors, and typically a combination of two or more of such factors.

Referring to FIGS. 1-3, the multiple bay doors are formed in the housing enabling one or more inbound vehicles and one or more outbound vehicles to align with one of the doors while products are distributed from each of the one or more inbound vehicles 302 to at least one of the outbound vehicles 304. The inbound and/or outbound vehicles align with the bay doors such that doors of the vehicles are positioned relative to the aligned bay door so that products can be transported between each vehicle and the MPDS. In some instances, the doors on the vehicles are on the back of the vehicles (e.g., roller doors, hinged doors, etc.), and the vehicle backs up into alignment with one of the bay doors. The multiple bay doors, in some applications, are arranged in the housing to enable one or more inbound vehicles to each align with one of the bay doors 104 while one or more outbound vehicles are simultaneously aligned with another of the bay doors.

Further, in some instances, the MPDS includes bumpers, pads, or the like that the inbound and/or outbound vehicles can contact in aligning and positioning the vehicle with the MPDS. In other instances, an inbound vehicle 302 and/or outbound vehicle 304 may align with a bay door with a distance separating the vehicle and the bay door. The size of the distance can vary depending on one or more factors, such as but not limited to whether the MPDS and/or vehicle has a ramp, bridge or the like that can extend between the MPDS and the vehicle, whether the MPDS includes a product movement system that can extend from the MPDS across a known distance, quantity of products to be transferred between the vehicle and the MPDS, size and/or weight of one or more of the products being distributed, other such factors, or combinations of two or more of such factors.

Figure 4:
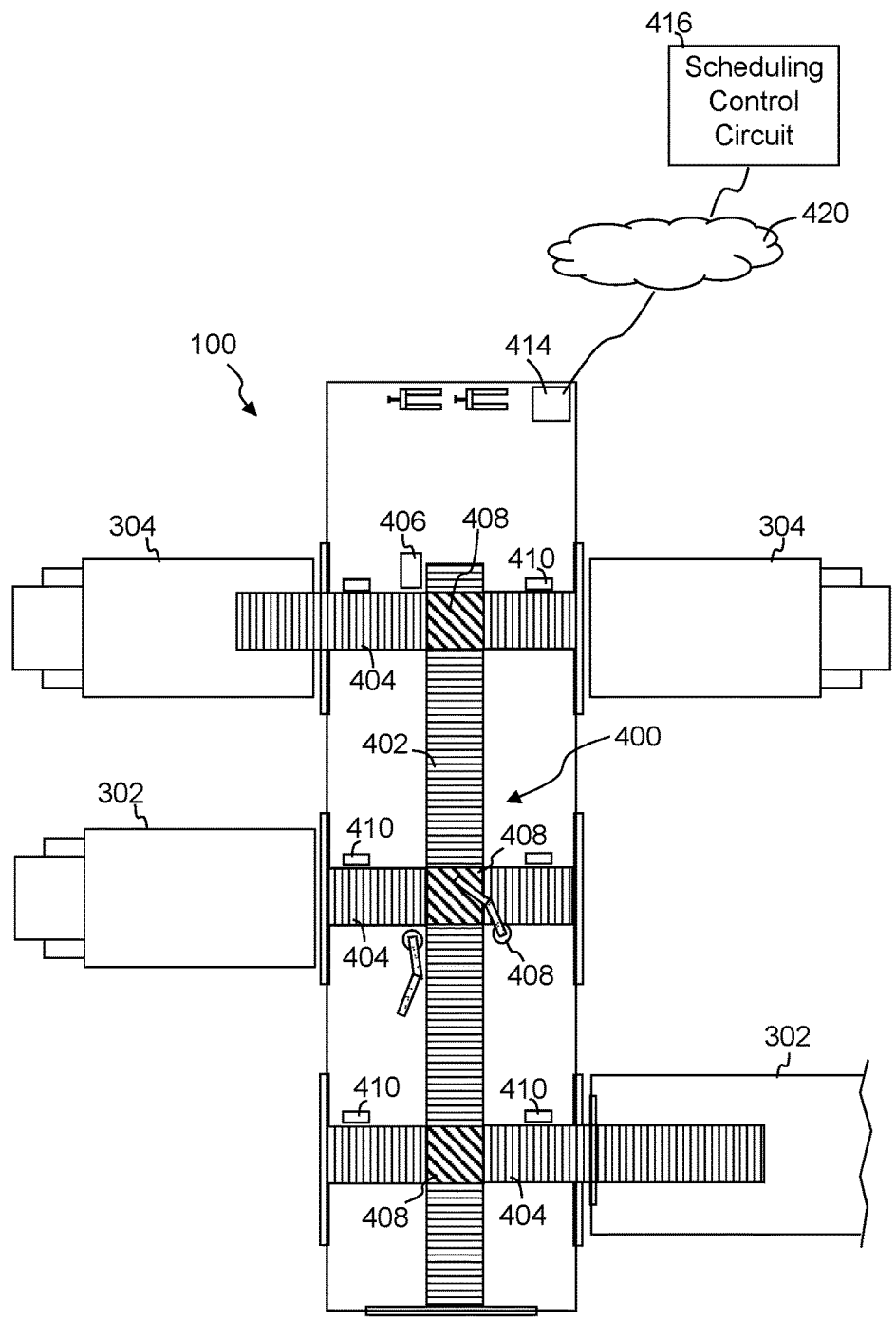
FIG. 4 provides a simplified block diagram illustrating an overhead, cross-sectional view of an exemplary MPDS, in accordance with some embodiments.

FIG. 4 provides a simplified block diagram illustrating an overhead, cross-sectional view of an exemplary MPDS 100, in accordance with some embodiments. Referring to FIGS. 1-4, in some embodiments, the MPDS further includes a product movement system 400 that is cooperated with, and typically maintained within the housing 102. The product movement system 400 extends between the multiple bay doors and is configured transport the products from each of the inbound vehicles 302, through the housing 102, and to at least one of the outbound vehicles 304. In some implementations, the product movement system 400 can be configured to extend from a first bay door to each of multiple other bay doors, allowing products to be transported between the multiple bay doors. For example, an inbound vehicle 302 may be aligned with the first bay door while first and second outbound vehicles are aligned with second and third bay doors, respectively. With the product movement system arranged to extend between the first bay door and the second and third bay doors, products can be transported at least from the first inbound vehicle to each of the first outbound vehicle and the second outbound vehicle.

In some embodiment, the product movement system includes one or more conveyor systems over which products can be moved and/or that are moved by the conveyor system. For example, the product movement system may include a conveyor system extending through the housing with the conveyor system including one or more conveyors. The conveyors provides conveyor paths between at least two bay doors and along which products are transported from at least an inbound vehicle to at least one outbound vehicle. In some implementations, the product movement system 400 includes a central conveyor system 402 comprising one or more conveyors that can be positioned along at least a portion of a length of the MPDS, with branch conveyor systems 404 each comprising one or more conveyors positioned adjacent the central conveyor system and extending toward one of the bay doors. In other implementations, the central conveyor may be a loop allowing products to be routed to intended bay doors and corresponding outbound vehicles at those intended bay doors. In yet other implementations, the conveyor system may be implemented through a hub and spoke configuration, conveyors extending directly between two bay doors, multiple layers of conveyors, or other configurations, or combination of two or more of such configurations.

Further, in some implementations, the conveyor systems 402, 404 may include one or more conveyor systems and/or conveyors that are expandable, retractable, and/or movable relative to each other, the bay doors and/or the housing. For example, as illustrated in FIG. 4, one or more of the conveyor systems 404 may be moved and/or expanded to extend into an inbound vehicle or outbound vehicle that is aligned with a bay door with which the conveyor system is similarly cooperated. This expansion and/or contraction may be implemented by a worker repeatedly expanding a conveyor system depending on a depth of products being removed from an inbound vehicle and/or loaded onto an outbound vehicle. In some instances, for example, one or more of the conveyor systems may comprises accordion hinges, scissor hinges, and/or other such mechanisms that allow the conveyor system to be expanded and collapsed. Additionally, in some instances, one or more of the conveyor systems may be moved, arranged to include one or more curves along its length, height of one or more sections to be adjusted relative to other portions of the conveyor system, other such modifications, or combination of such modifications. Further, one or more of the conveyor systems may include an array of wheels, rollers or the like that allow products to roll and/or be pushed along a length of the conveyor system.

The conveyor system may, in some implementations, include an automated routing system that includes a conveyor system controller 406 that couples with and controls one or more product routers 408. The product routers 408 can be activated to direct one or more products onto and/or along one or more of the conveyor systems 402, 404. In some implementations, the product router comprises a turn-table and a motor that rotates the turn-table. The conveyor system controller can control the turn-table to rotate a predefined angle to direct one or more products to a conveyors system that carriers the product to the intended recipient vehicle. In some instances the product routers 408 additionally or alternatively include comprise one or more motorized guide arms that can extend, retract, rotate and/or perform other movements to direct and guide products onto and/or along intended conveyor systems. In some instances, the motorized product router 408 may further include a push system (e.g., one or more rotatable rollers, balls or the like) that can be activated to push one or more products in an intended direction. This can be advantageous when the conveyor systems do not include motorized rollers to advance the product along the conveyor systems. Similarly, the guide arms may act to push the one or more products.

Some embodiments further include a scanner system that comprises one or more detector and/or scanner systems 410. The scanner system can be positioned adjacent to, under, and/or over one or more conveyor systems 402, 404, carried by workers, positioned on inbound and/or outbound vehicles and in communication (wired and/or wirelessly) with the conveyor system controller 406, incorporated into a conveyor system, other such placement, or a combination of two or more of such placement. Further, the scanner systems can be substantially any relevant detector and/or scanner that can detect identifying information from a product and/or package. For example, the scanner system may include one or more RFID scanners, one or more bar code scanners, one or more imaging systems to capture images and text recognition performed, images can be compared with reference images, other such scanners, or combination of two or more of such scanners. In some embodiments, the scanner systems are configured to detect a product identifier of a product traveling along a conveyor of the conveyor system. The product identifier can be communicated (via wired and/or wireless communication) to the conveyor system controller 406. Using the product identifier, the conveyor system controller is configured to identify an intended outbound vehicle and a corresponding bay door at which the outbound vehicle is located and/or is to be located, and/or communicate with a separate inventory system that identifies an intended outbound vehicle and a corresponding bay door. The conveyor system controller may receive inventory information and/or routing information that specifies products intended to be routed to each outbound vehicle. Upon receiving an identifier of a vehicle at an identified bay door, the conveyor system can appropriately route an identified number of products to the intended outbound vehicle by controlling one or more of the product routers. In some implementations, for example, a plurality of motorized product routers 408 are positioned to move relative to conveyors of the conveyor system and are controlled to move, based on instructions from the conveyor system controller, to direct identified products toward one or more of the bay doors and intended outbound vehicles.

Further, the conveyor system controller 406 is typically configured to enable the simultaneous distribution of products from multiple inbound vehicles to multiple outbound vehicles. The conveyor system controller, based on knowledge of what vehicles are associated with which bay door, can communicate instructions to control one or more of the motorized product routers 408 to simultaneously direct multiple distinct and separate products, based on the product identifier of each of the products, from multiple inbound vehicles each aligned with one of the multiple bay doors, to multiple outbound vehicles each aligned with one of the multiple bay doors while the multiple inbound vehicles are aligned with one of the multiple bay doors. In some applications, the conveyor system controller determines the routing in response to receiving product identifier information. In other instances, a separate inventory routing system and/or a separate MPDS control circuit can access inventory routing information, and based on received product identifier information of products being and/or to be transported through the MPDS, determine product routing along the conveyor system, and can communicate that routing to the conveyor system controller.

In some embodiments, the product movement system can further comprise one or more pallet transport systems 502. The pallet transport systems can include pallet jacks, fork lift systems, and/or other such systems that can transport large products and/or larger collections of products, such as a pallet loaded with one or more products. In some applications, the MPDS can be configured with space between at least two bay doors to allow the pallet transport system to move between the two bay doors allowing the transport of products from an inbound vehicle at a first bay door to an outbound vehicle at a second bay door.

Figure 5:
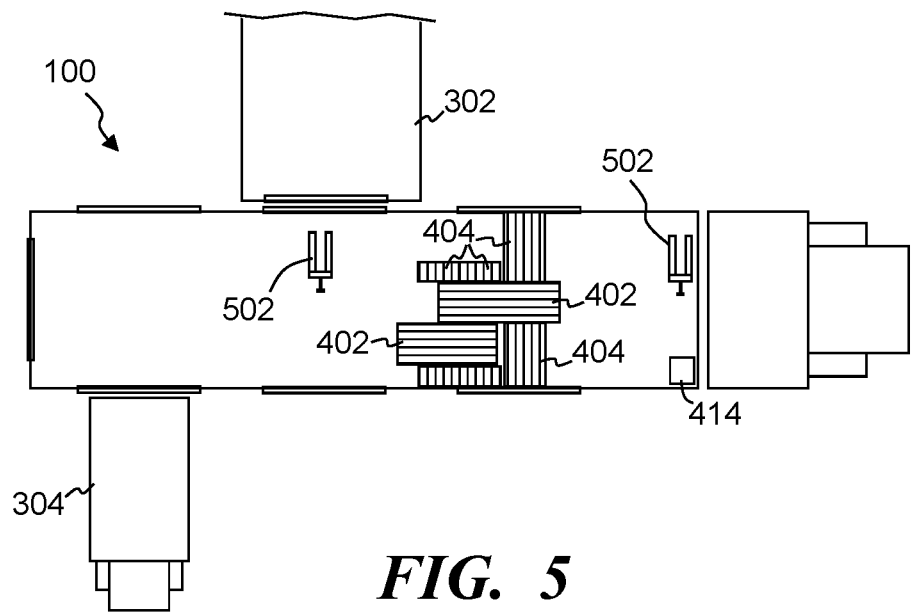
FIG. 5 shows an exemplary MPDS with multiple conveyor systems, where some of the conveyor systems have been collapsed, in accordance with some embodiments.
Figure 6:
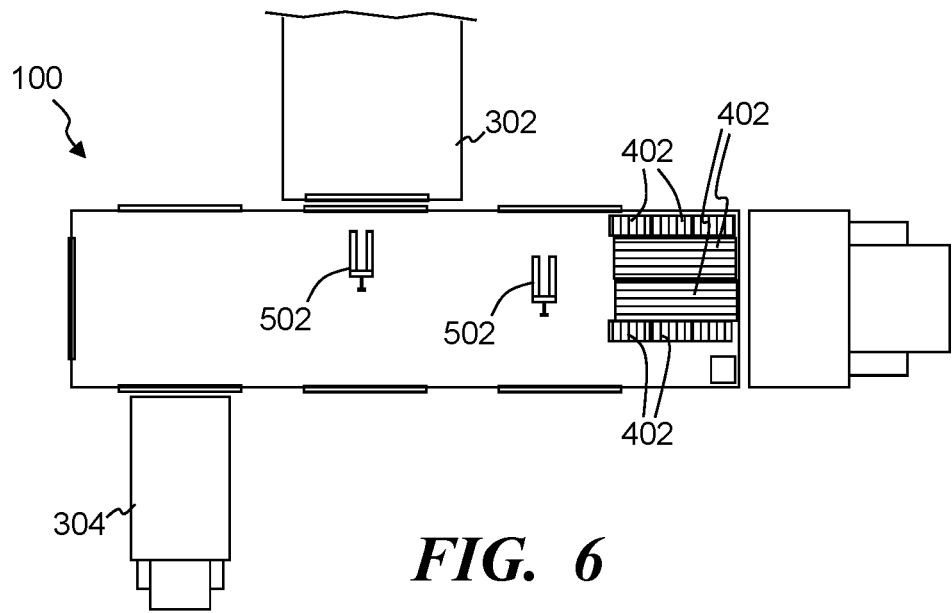
FIG. 6 shows an exemplary MPDS with all of the conveyor systems collapsed and/or moved, in accordance with some embodiments.

Further, as introduced above, in some applications the conveyor systems may include one or more conveyor systems and/or conveyors that are expandable, retractable, and/or movable relative to each other, the bay doors and/or the housing. For example, one or more of the conveyor systems can be moved, expanded and/or collapsed to free up space within the MPDS. FIG. 5 shows an exemplary MPDS 100 with multiple conveyor systems 402, 404, where some of the conveyor systems have been collapsed, in accordance with some embodiments. FIG. 6 shows the exemplary MPDS 100 with all of the conveyor systems 402, 404 collapsed and/or moved, in accordance with some embodiments. With the some or all of the conveyor systems partially or fully collapses and/or moved, space is opened up within the MPDS. Some embodiments further include one or more pallet transport systems 502. One or more of the conveyor systems are movable to open space between at least a first bay door and a second bay door to enable movement of the pallet transport system to cooperate with and transport heavy products, collections of products (e.g., one or more a pallets of products), or the like, from at least one inbound vehicle 302 to one or more outbound vehicles 304.

Figure 7:
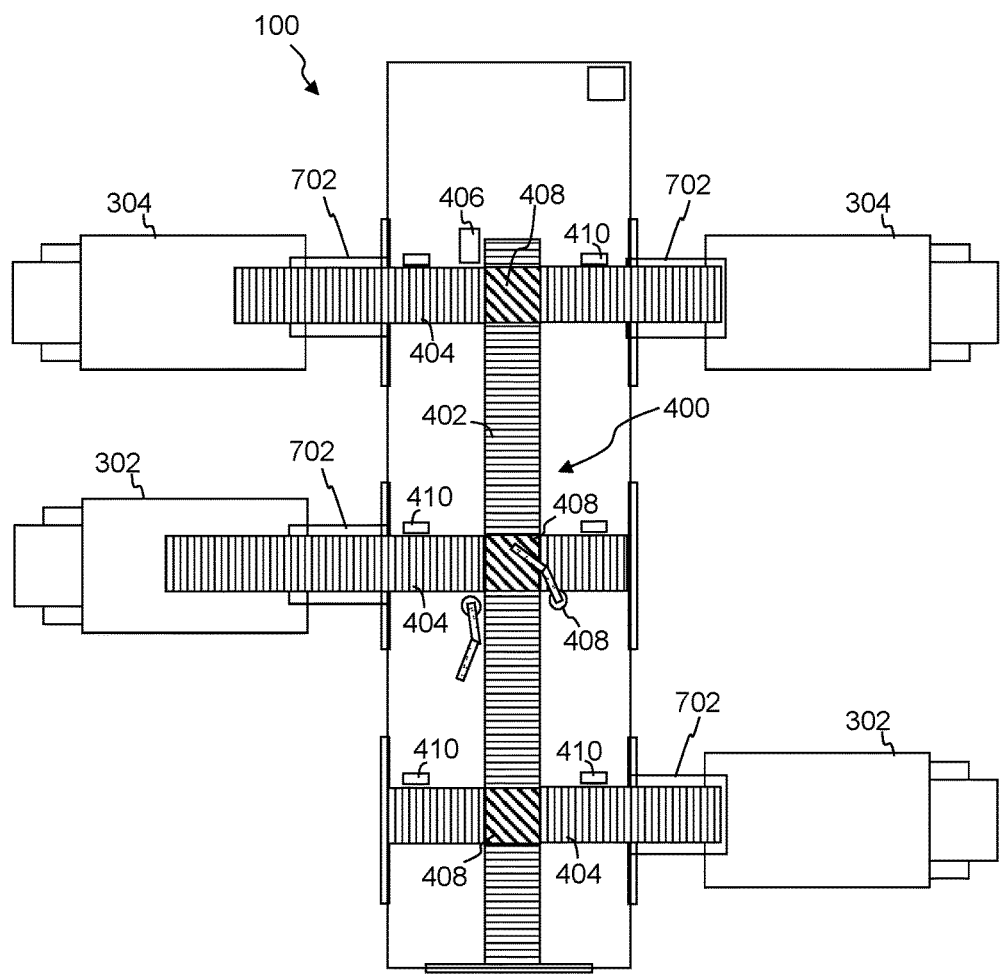
FIG. 7 a simplified block diagram illustrating an overhead, cross-sectional view of an exemplary MPDS, in accordance with some embodiments.

Some embodiments may further include one or more loading ramps 702, bridges, planks, or the like. FIG. 7 a simplified block diagram illustrating an overhead, cross-sectional view of an exemplary MPDS 100, in accordance with some embodiments, further showing loading ramps 702 extended from the MPDS to cooperate with an inbound or outbound vehicle aligned with the bay door with which the loading ramp is associated. Typically, each loading ramp is associated with one of the bay doors 104. The loading ramps 702 are configured to extend from the MPDS to cooperate with a vehicle aligned with the bay door with which the loading ramp is associated (or extend from the vehicle to cooperate with the MPDS).

The loading ramp 702 can be positioned to cooperate between the MPDS and an inbound or outbound vehicle while the products are transferred through the mobile product distribution system to or from the inbound or outbound vehicle. In some applications, the loading ramp is extended into the cargo area of the inbound or outbound vehicle, while in other instances the loading ramp may cooperate with a coupling structure (e.g., tongue and groove, hook and aperture, latch, etc.) that releasably secures the loading ramp with the inbound or outbound vehicle. For example, the loading ramp may include one or more hooks, L-brackets, or the like that can mate with receiving apertures formed in a door frame of the vehicle. This can allow the loading ramp to be positioned substantially flush and at substantially similar level as the floor of the cargo area of the inbound or outbound vehicle. In other instances, the loading ramp may be extended to merely be near or abut against a portion of an inbound or outbound vehicle. The loading ramps can be constructed of substantially any relevant material that can support the expected weight to be applied in loading and/or unloading of products (e.g., aluminum, steel, other metals, combinations of metals, wood, plastic, other such materials, or combination of two or more of such materials). In some applications the loading ramps are manually moved by a worker. One or more motors may alternatively or additionally be cooperated with one or more loading ramps and activated to extend or retract the loading ramp.

Referring back to FIGS. 1-2, some embodiments further include a height control system 204 that when implemented can be used to adjustment of a height of a least a portion of the mobile product distribution system 100. The height control system can be implemented through hydraulics, threaded crank systems, or the like. In some applications, one or more supports cooperate with the housing and/or a frame of the housing, and can be extended and retracted. For example, a support can be positioned proximate each corner of the housing and individually controlled to adjust a height of the housing, and thus the floor of the housing. The adjustment of the supports can be through manual adjustments (e.g., pump, rotating crank, or the like), or through one or more motors that can operate a pump, rotating crank or the like. In other instances, hydraulics can be additionally or alternatively cooperated with one or more axles and a height adjusted through the control of the hydraulics. The height control system can be utilized to level the MPDS, put the MPDS at an angle (e.g., to help movement of one or more products), to provide alignment between the MPDS with at least one of the inbound vehicles and the outbound vehicles (e.g., a floor of the MPDS level with a floor of a cargo area of an inbound or outbound vehicle), to establish a height difference between the MPDS and one or more inbound and outbound vehicles (e.g., to aid in movement of products on a conveyor system), compensate for inconsistencies in the ground on which the MPDS and/or a vehicle is resting, other such reasons, or a combination of two or more of such reasons.

Referring to FIGS. 1-7, in some embodiments, the MPDS 100 includes a distribution system control circuit 414 that can, in some applications, provide and/or implement one or more vehicle cooperation schedules defining which bay door each of the inbound and outbound vehicles is to align with, and when each of the inbound vehicles and the outbound vehicles is to align with one of the multiple bay doors. This vehicle cooperation schedule may be based on scheduled arrival and/or departure times, distance a vehicle is from the MPDS, anticipated time a vehicle is to arrive at the temporary location, product distribution schedules, priority products, priority vehicles, and/or other such information. In some embodiments, the distribution system control circuit couples with one or more wired and/or wireless transceivers to receive inbound vehicle identifiers for each inbound vehicle that is within one or more inbound thresholds distances from the mobile product distribution system, and/or to receive outbound vehicle identifiers for each outbound vehicle that is within one or more outbound threshold distance of the mobile product distribution system. In other instances, the distribution system control circuit may receive such vehicle identifier information and/or estimates of arrival at the MPDS from one or more remote systems, such as a scheduling control circuit, an inventory distribution control circuit that is cooperated with one or more geographically fixed distribution centers, source shipping locations (e.g., shipping docks, train depots, etc.), or other such remote system.

Based on the arrival times and/or estimated arrival times (e.g., the distribution system control circuit may estimate arrival times based on a vehicle's distance from the MPDS, historical travel times, other stops a vehicle is scheduled to make, and/or other such information), the distribution system control circuit may schedule when each of the inbound vehicles and the outbound vehicles is to align with one of the multiple bay doors 104. The distribution system control circuit can further communicate a notification to each of the inbound vehicles and the outbound vehicles specifying timing of when each of the inbound vehicles and the outbound vehicles is to align with one of the multiple bay doors and specifies a bay door identifier with which each of the inbound vehicles and the outbound vehicles is to align. In some instances, the distribution system control circuit may further activate one or more indicators on the MPDS, guide lighting on the MPDS, cause a bay door to be opened and/or other such actions to help a driver of the vehicle to identify a relevant bay door and when the driver should move the inbound or outbound vehicle to align with a bay door.

In some embodiments, the distribution system control circuit 414 may additional or alternatively generate and/or receive a product distribution plan that identifies a number of each product to be moved from each of the inbound vehicles and a number of each product to be moved into each of the outbound vehicles. In some instances, the distribution system control circuit receives identifiers of each of the inbound vehicles and the outbound vehicles aligned with and/or scheduled to align with one of the multiple bay doors. Based on the vehicle identifier information and the association with a bay door, the distribution system control circuit generates a distribution plan identifying a number of each product to be moved from each of the inbound vehicles and a number of each product to be moved into each of the outbound vehicles. In some instances, the distribution plan and be communicated to the conveyor system controller 406, when present, to control the product routers 408 in directing products through the product movement system 400. Additionally or alternatively, some or all of the distribution plan can be communicated to workers to direct the workers unloading products from inbound vehicles, loading products to outbound vehicles, moving products through the MPDS and/or along the product movement system, and the like. For example, the product distribution plan can be communicated to a worker's user interface unit (e.g., smart phone, tablet, specifically configured electronic device, or other such device) that can display and/or audibly notify the worker. In some instances, the user interface unit may further scan products and/or obtain product identifiers, and this information can be used by the user interface units in relation to the distribution plan to notify the worker regarding how the product is to be routed through the MPDS, and/or communicates the product identifying information to the distribution system control circuit that can determine routing based on the distribution plan. Similarly, the distribution plan may be communicated to one or more of the scanner systems 410, and upon obtaining identifier information can determine routing based on the distribution plan and can direct workers and/or provide routing instructions to the conveyor system controller 406.

Some embodiments further include a scheduling control system and/or circuit 416 that is part of the MPDS 100 (e.g., cooperated with the distribution system control circuit 400) or remote from the MPDS and in wired and/or wireless communication (e.g., via a distributed communication network 420, such as cellular, Internet, etc.) with the distribution system control circuit and/or other components of the MPDS. The scheduling control circuit 416 obtains, for each of the multiple inbound vehicles 302, a source location from which the inbound vehicle is to transport at least one product. The source locations can be a shipping dock, train depots, geographically fixed distribution centers, manufacturer locations, warehouses, and other such locations where an inbound vehicle obtains products that it is to transport. Further, the scheduling control circuit can obtain multiple destination locations that are scheduled to receive at least one of the multiple products being transported by the inbound vehicles and to which at least one of the multiple outbound vehicles is to travel. The destination locations may be a retail facility intending to sell the products to customers, a customer's delivery address (e.g., home, office or other such customer specified delivery location), a subsequent distribution center, a third party distribution facility, or the like. The scheduling control circuit 416 can select a temporary distribution location of multiple different predefined temporary distribution locations as a function of the multiple destination locations and at least one of the source locations. Once selected, the scheduling control circuit can cause an instruction to be communicated to cause the mobile product distribution system 100 to be transported to the selected temporary distribution location. This communication can be communicated to a navigation system of the MPDS, a navigation system of the towing tractor 106, to a user interface unit of a driver of the MPDS and/or towing tractor, or the like. Using this information the MPDS can be transported to the selected one of the multiple different predefined temporary distribution locations. As introduced above, the MPDS can be transported to different ones of the predefined distribution locations to enable distribution between numerous sets of inbound and outbound vehicles to provide an enhanced, simplified, and/or more efficient distribution of at least some products for some destination locations. Further, the MPDS can provide more economical distribution of products by reducing travel times and travel distances that products have to be transported, improves delivery times, provides improved freshness at the destination locations, reduces storage needs at geographically fixed distribution centers, and other such benefits.

As such, the scheduling control circuit can take into consideration many factors in selecting the one or more temporary distribution locations to which the MPDS is to be transported. These factors can include, but are not limited to, one or more of, reducing travel times and/or travel distances that products have to be transported, perishability and/or freshness of products, distance between source locations and destination locations, distance between non-moving fixed distribution centers and destination locations, location of destination locations relative to a route between a source location and an intended geographically fixed non-moving distribution center, locations of destination locations relative to routes between source locations and intended fixed distribution centers, weight of products, quantity of products, cost of fuel and predicted amount of fuel to be used by vehicles, other such factors, and typically a combination of two or more of such factors. In some instances, for example, the scheduling control circuit can identify a plurality of destination locations intended to receive products from inbound vehicles, identify a location of a fixed distribution center, and identify one or more destination locations of the plurality of locations that are both at a threshold distance from the location of the fixed distribution center and between the source locations and the location of the fixed distribution center.

The scheduling control circuit may, in some instances, further select a temporary distribution location based on distances between the multiple different temporary distribution locations and the multiple destination locations, and fuel consumption in transporting the products from at least one of the source locations to the multiple destination locations. Additionally or alternatively, the scheduling control circuit can select the temporary distribution location in optimizing a reduction in distance the one or more of the products are transported from one or more of the source locations and the multiple destination locations.

Figure 8:
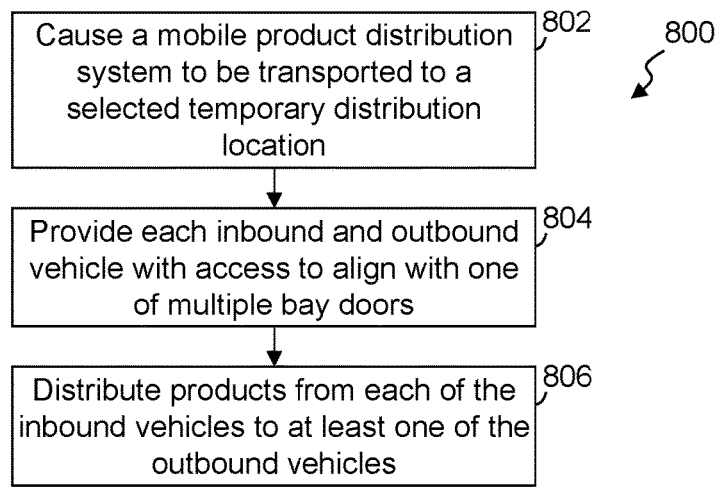
FIG. 8 illustrates a simplified flow diagram of an exemplary process of distributing products through a MPDS, in accordance with some embodiments.

FIG. 8 illustrates a simplified flow diagram of an exemplary process 800 of distributing products through a MPDS 100, in accordance with some embodiments. In step 802, the distribution system control circuit 414, a scheduling control circuit 416, and/or other control circuit can communication instructions to cause a mobile product distribution system 100 to be transported, via a wheel system 202 of the mobile product distribution system, to a selected temporary distribution location of multiple predefined temporary distribution locations. The temporary distribution locations can be selected based on size to enable multiple inbound and/or outbound vehicles to align with bay doors 104, ease of access (e.g., close to freeway off-ramps, roads that can support large trucks, ease of ingress and egress, and other such factors).

In step 804, one or more inbound vehicles and one or more outbound vehicles are provided with access to align with one of the multiple bay doors 104 formed in the housing 102 of the mobile product distribution system and with which corresponding ones of the inbound and outbound vehicles align. In some implementations, the order by which the inbound and outbound vehicles are provided access to a bay door is based on one or more vehicle cooperation schedules defining which bay door each of the inbound and outbound vehicles is to align with, and may further specify when each of the inbound vehicles and the outbound vehicles is to align with one of the multiple bay doors. The scheduling is variable and often repeatedly updated based on which vehicles are actually at the temporary location, when vehicles are anticipated to be at the temporary location, delivery schedules of vehicles to delivery to different destinations, types of product to be distributed at the temporary locations, types or destination locations, other such factors, or a combination of two or more of such factors. Further, the access to the MPDS typically includes enabling at least one inbound vehicle to align with a first bay door of the multiple bay doors while at least one and often multiple outbound vehicles are each simultaneously aligned with a separate bay door (e.g., a first outbound vehicle is simultaneously aligned with a second bay door and a second outbound vehicle is simultaneously aligned with a third bay door). Further, in some implementations, the product movement system includes one or more conveyor systems with at least one conveyor providing a conveyor path between at least two bay doors and along which products are transported from a first inbound vehicle to a first outbound vehicle of the multiple outbound vehicles.

In step 806, products from each of the inbound vehicles are distributed to at least one of the outbound vehicles while aligned with one of the multiple bay doors, including transporting the products through the housing 102 by the product movement system 400 within the housing. In some embodiments, the product movement system 400 extends between at least two bay doors from each of at least one inbound vehicle to at least one of the outbound vehicles. For example, the products can be transported along the product movement system extending from a first bay door and each of second and third bay doors, which can allow products to be moved between the three doors in any combination (e.g., from a first inbound vehicle at the first bay door to first and second outbound vehicles at the second and third bay doors, from two inbound vehicles at first and second bay doors to a first outbound vehicle at a third bay door, products distributed between three vehicles where each of the vehicles is an inbound vehicle in distributing products from the vehicles and also an outbound vehicle in receiving products). Additionally or alternatively, one or more pallet transport systems 502 may be used to transport products between vehicles. This may, in some instances, include transporting products along one or more conveyor systems 402, 404 to a location within the MPDS and/or an outbound vehicle, where workers may combine products onto one or more pallets or other such support structure, and then a pallet transport system may then be utilized to transport the cooperated products to one of the outbound vehicles.

In some embodiments, a product identifier of each product traveling along a conveyor of the conveyor system is detected and/or received. For example, one or more detector and/or scanner systems 410 can detect and provide the product identifier to a conveyor system controller. An intended outbound vehicle 304, and a corresponding one of the bay doors where the intended outbound vehicle is located, can be identified for each product being transported through the MPDS. One or more product routes can be controlled, based on the identification of the bay door where the corresponding outbound delivery vehicle is located, to move and direct each of the identified products toward the corresponding one of the bay door and the intended outbound vehicle. In controlling the motorized product routers, instructions can be communicated to control the motorized product routers to simultaneously direct each of multiple distinct and separate products, based on the product identifier of each of the products, from multiple inbound vehicles each aligned with one of the multiple bay doors, to one of the multiple outbound vehicles each aligned with one of the multiple bay doors while the multiple inbound vehicles are aligned with one of the multiple bay doors.

In some embodiments, the conveyor systems are extendable, collapsible and/or movable. The movement and/or collapsing of conveyor systems can open up space within the MPDS, and/or can be implemented to secure the conveyor systems while the MPDS is transported between locations. One or more of the conveyors of a conveyor system can be moved and/or collapsed, for example, to create open space between at least a first bay door and a second bay door, and enabling movement of a pallet transport system to cooperate with and transport at least a pallet or collection of products from a first inbound vehicle at the first bay door to a first outbound vehicle at the second bay door.

Some embodiments further direct when inbound and outbound vehicles are to align with the MPDS. Inbound vehicle identifiers can be received for each inbound vehicle, and similarly outbound vehicle identifiers can be received from each outbound vehicle. These identifiers may be received from a scheduling control circuit 416, received from the vehicles, a vehicle dispatch system, other sources, or combination of two or more of such sources. Further, the identifiers may be received prior to vehicles being instructed to go to the temporary location, prior to products being loaded onto inbound vehicles, prior to inbound or outbound vehicles being routed to the temporary distribution location, when a vehicle is within a threshold distance of the MPDS, other such times, or a combination of two or more of such times. In some instances, inbound vehicle identifiers are wirelessly received when the inbound vehicles are within a first threshold distance of the mobile product distribution system. Similarly, in some instances, outbound vehicle identifiers may be wirelessly received for each outbound vehicle that is within a second threshold distance of the mobile product distribution system. A vehicle cooperation scheduling can be generated (e.g., through a distribution system control circuit 414 of the mobile product distribution system, a remote scheduling control circuit 416, or other such source) that specifies when each of the inbound vehicles and the outbound vehicles is to align with one of the multiple bay doors. A notification can be communicated to each of the inbound vehicles and the outbound vehicles specifying timing of when each of the inbound vehicles and the outbound vehicles is to align with one of the multiple bay doors, and specifying a bay door identifier with which each of the inbound vehicles and the outbound vehicles is to align.

Some embodiments further generate one or more distribution plans based on the inbound and outbound vehicles aligned with one of the bay doors and/or scheduled to align with one of the bay doors, the products to be distributed, and the like. In some instances, identifiers are received of each of the multiple inbound vehicles and the multiple outbound vehicles aligned and/or scheduled to align with one of the multiple bay doors. A distribution plan can be generated identifying a number of each product to be moved from each of the multiple inbound vehicles aligned or scheduled to align with one of the bay doors, and a number of each product to be moved into each of the multiple outbound vehicles aligned with or scheduled to align with one of the bay doors.

As introduced above, some embodiments include one or more loading ramps 702. A loading ramp associated with each of at least one of the multiple bay doors can be extended to cooperate with one of the inbound and outbound vehicles while the products are transferred through the mobile product distribution system. Further, some embodiments may activate a height control system to adjust a height of a least a portion of the mobile product distribution system. The height control system may enable alignment with at least one of the multiple inbound vehicles and the multiple outbound vehicles, level a floor of the MPDS, provide a desired tilt to the floor of the MPDS, and the like.

Further, some embodiments schedule which of the plurality of predefined temporary distribution locations to which one or more of the MPDSs are to be routed. In determining scheduling, some implementations identify a source location of each of the multiple inbound vehicles from which a corresponding one of the multiple inbound vehicles is to transport at least one product of multiple products. Further, multiple destination locations to receive at least one of the multiple products and to which at least one of the multiple outbound vehicles is to travel are identified. One or more of the temporary distribution locations of multiple different predefined temporary distribution locations can be selected where one or more mobile product distribution systems are to be temporarily positioned to enable products to be distributed from the multiple inbound vehicles to the multiple outbound vehicles. In many instances, the one or more temporary distribution locations are selected as a function of the multiple destination locations and at least one of the source locations. Instructions are communicated to cause the one or more mobile product distribution systems to be transported to respective ones of the one or more selected temporary distribution locations. Similarly, additional multiple destination locations can be identified that are to receive products and to which one or more additional multiple outbound vehicles are to travel. A second temporary distribution location of the multiple different predefined temporary distribution locations can be selected as a function of the additional multiple destination locations. Instructions can be communicated to cause the mobile product distribution system to be moved from the first temporary distribution location and transported to the second temporary distribution location.

In selecting one or more temporary distribution locations, some embodiments further identify a location of a non-moving fixed distribution center, and further identify the multiple destination locations that are both at a threshold distance from the location of the fixed distribution center and between the source locations and the location of the fixed distribution center. Additionally or alternatively, some embodiments select the temporary distribution location based on distances between the multiple different temporary distribution locations and the multiple destination locations, and/or fuel consumption in transporting the at least one product from the at least one of the source locations to the multiple destination locations. Some embodiments may further select the first temporary distribution location in optimizing a reduction in distance one or more products is transported from at least one of the source locations and to the multiple destination locations.

Figure 9:
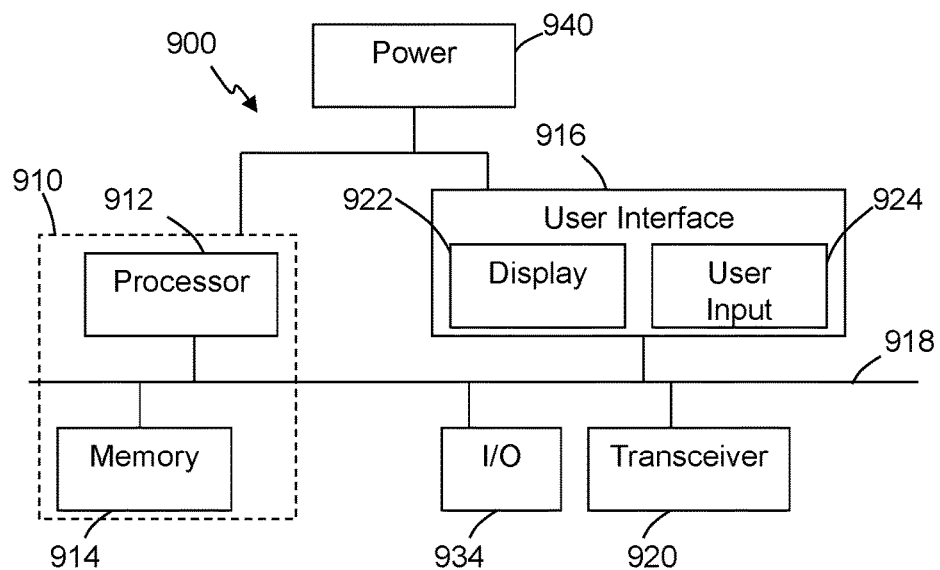
FIG. 9 illustrates an exemplary system for use in implementing methods, techniques, devices, apparatuses, systems, servers, sources and the like in loading and/or unloading products in accordance with some embodiments.

Further, the processes, methods, techniques, circuits, circuitry, systems, devices, functionality, services, servers, sources and the like described herein may be utilized, implemented and/or run on many different types of devices and/or systems. Referring to FIG. 9, there is illustrated an exemplary system 900 that may be used for any such implementations, in accordance with some embodiments. One or more components of the system 900 may be used for implementing any circuitry, system, functionality, apparatus, process, or device mentioned above or below, or parts of such circuitry, functionality, systems, apparatuses, processes, or devices, such as for example any of the above or below mentioned distribution system control circuit 414, scheduling control circuit 416, conveyor system controller 406, scanner system 410, pallet transport system controller, loading ramp controller, vehicle control system, navigation system, inventory system, user interface units, and/or other such circuitry, functionality and/or devices. However, the use of the system 900 or any portion thereof is certainly not required.

By way of example, the system 900 may comprise a controller circuit or processor module 910, memory 914, and one or more communication links, paths, buses or the like 918. Some embodiments may include one or more user interfaces 916, and/or one or more power sources or supplies 940. The controller circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, programs, content, listings, services, interfaces, logging, reporting, etc. Further, in some embodiments, the controller circuit 912 can be part of control circuitry and/or a control system 910, which may be implemented through one or more processors with access to one or more memory 914, which can store code that is implemented by the controller circuit and/or processors to implement intended functionality. In some applications, the controller circuit and/or memory may be distributed over a communications network (e.g., LAN, WAN, Internet) providing distributed and/or redundant processing and functionality. The user interface 916 can allow a user to interact with the system 900 and receive information through the system. In some instances, the user interface 916 includes a display 922 and/or one or more user inputs 924, such as a buttons, touch screen, track ball, keyboard, mouse, etc., which can be part of or wired or wirelessly coupled with the system 900.

Typically, the system 900 further includes one or more communication interfaces, ports, transceivers 920 and the like allowing the system 900 to communicate over a communication bus, a distributed communication network (e.g., a local network, the Internet, WAN, etc.), communication link 918, other networks or communication channels with other devices and/or other such communications or combinations thereof. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports.

The system 900 comprises an example of a control and/or processor-based system with the controller circuit 912. Again, the controller circuit 912 can be implemented through one or more processors, controllers, central processing units, logic, software and the like. Further, in some implementations the controller circuit 912 may provide multiprocessor functionality.

The memory 914, which can be accessed by the controller circuit 912, typically includes one or more processor readable and/or computer readable media accessed by at least the controller circuit 912, and can include volatile and/or non-volatile media, such as RAM, ROM, EEPROM, flash memory and/or other memory technology. Further, the memory 914 is shown as internal to the system 910; however, the memory 914 can be internal, external or a combination of internal and external memory. Similarly, some or all of the memory 914 can be internal, external or a combination of internal and external memory of the controller circuit 912. The external memory can be substantially any relevant memory such as, but not limited to, one or more of flash memory secure digital (SD) card, universal serial bus (USB) stick or drive, other memory cards, hard drive and other such memory or combinations of such memory. The memory 914 can store code, software, executables, scripts, data, content, lists, programming, programs, log or history data, user information and the like. In some implementations, for example, the memory stores computer instructions that when executed by the scheduling control circuit cause the scheduling control circuit to: identify, for each of the multiple inbound vehicles, a source location from which a corresponding one of the multiple of inbound vehicles is to transport at least one product of multiple products; identify multiple destination locations to receive at least one of the multiple products and to which at least one of the multiple outbound vehicles is to travel; select a first temporary distribution location of the multiple different temporary distribution locations as a function of the multiple destination locations and at least one of the source locations; and communicate instructions to cause the mobile product distribution center to be transported to the selected first temporary distribution location.

In some implementations, the MPDS is utilized as part of a distribution process in preparing products for shipment. One or more product suppliers may delivery products to an initial shipping location (e.g., a port, a rail depot, trucking center, or the like). A confirmation of the delivery of the products to the initial shipping location can be recorded by an inventory tracking and/or control system. In some instances, a mobile application on a smart phone, tablet, specially configured electronic device, or the like can be used to confirm the delivery to the initial shipping location. The inventory tracking system can receive the confirmation, and typically records the delivery (e.g., in one or more databased, manifests, or the like). The inventory tracking system may in some applications compile a listing of supplied goods from the one or more suppliers. Further, the inventory tracking system may identify those products of the delivered products to be shipped to the same location. The inventory tracking system may further filter the list based on an identification of intended destination locations of one or more of the products, a location of an intermediary shipping location, a location of one or more fixed distribution centers and/or other such information. For example, the list may be filtered based on destination locations that are positioned between a receiving port, rail station or the like, and a fixed distribution center. The filtered listing may be communicated to a consolidator system. Positioning information of shipping containers and/or products within shipping containers may be communicated to one or more MPDSs and/or one or more scheduling control circuits.

A consolidator at a receiving port or the like uses the listing to identify shipping containers and/or collections of products intended to be transported in a predefined direction, route or the like, and typically in a direction toward a preselected, fixed distribution center. For example, one or more MPDSs can be used to redistribute the supplied products for a given fixed distribution center, to one or more containers intended to be routed to a shopping facility instead of the fixed distribution system. The containers and/or collections of products are loaded onto subsequent transport vehicles (e.g., ships, trains, trucks, inbound vehicles and/or other such vehicles). The containers can then be shipped to destination ports, stations or the like.

In some instances, the containers may be transported (e.g., as part of inbound vehicles) to one or more MPDS and/or to destination locations. At one or more MPDS, the products may be distributed for subsequent shipping (e.g., at a port, rail station or the like), and subsequently transported to a destination port, train station, etc. The arrival of the shipment may be tracked and recorded. At the destination port, station, etc. the containers and/or collections of products can be further distributed through an MPDS and/or routed toward remote MPDSs, retail locations, fixed distribution centers or the like.

Again, one or more inbound vehicles can be routed to an MPDS and align with bay doors of the MPDS while one or more outbound vehicles are aligned with other bay doors. Similarly, one or more of the inbound vehicles aligned with a bay door may move out and one or more other inbound vehicles may move into to align with a bay door while one or more outbound vehicles remain in alignment with a bay door to receive products from multiple different inbound vehicles. Similarly, one or more outbound vehicles aligned with a bay door may move out and one or more other outbound vehicles may move into to align with a bay door while one or more inbound vehicles remain in alignment with a bay door so that additional outbound vehicles can receive products from the one or more inbound vehicles. Inbound and outbound vehicles may be repeatedly directed to align with a bay door and move away from a bay door as part of the scheduled distribution as products are distributed between multiple inbound and outbound vehicles. Again, in some instances, inbound vehicles may also be outbound vehicles and may bring products to a MPDS, and also receive products to be routed to one or more destination locations, other MPDSs, a fixed distribution center, and/or other such location. Once products are distributed to one or more outbound vehicles, the outbound vehicles can transport the products to the intended one or more destination locations (e.g., directly to a customer delivery location, a retail facility, a fixed distribution center, etc.).

In some embodiments, products are transported to the same retail facility may be delivered by one or more suppliers. Suppliers may send notification to an inventory tracking systems when products have been delivered to a source loading port, rail station, or the like. A confirmation of delivery to the source loading port can be saved. A list of goods can be complied that are supposed to go to a retail facility, a collection of facilities or the like. The list can be filtered to identify which products would be transported to retail facilities that are located between a destination port, station, or the like, and a fixed distribution center. This list can then be sent to a consolidator for preparing the goods for shipping out of the source loading port. The consolidator may use a mobile product distribution system to consolidate goods from one or more suppliers, and fill containers that can go directly to a shopping facility and/or to one or more remote MPDSs that are closer to the intended destination location, instead of the fixed distribution center. The mobile product distribution system can be configured from a vehicle, which may include a product movement system that can distribute goods to outbound containers. The consolidator will cause the outbound containers to be shipped to the destination port. After goods are received at the destination port, transportation will deliver the containers to an intended delivery location (e.g., a shopping facility), a MPDS for subsequent distribution to outbound vehicles, and/or to a fixed distribution center. The MPDS can be utilized at any point in the supply chain process providing a mobile hub at a temporary location to redistribute products. Similarly, one or more MPDSs may could be used in disaster relief programs, where the MPDS provides a solution to more efficiently redistribute products from one or more donator sources. Further, the distribution in disaster relieve can provide distribution at locations closer to where the relief is needed. Still further, one or more MPDSs may be temporarily utilized at a fixed distribution center during disaster relief when the fixed distribution center is damaged and/or overloaded. The use of the MPDS can reduce fuel consumption (e.g., reducing or eliminating transporting products past the same points multiple times); reduce shipping times (e.g., faster goods from supplier to shopping facilities and/or customer), which can be beneficial for perishables; lower total cost of products; allow distribution of products to occur earlier in the process while also allowing for cutting out steps in the distribution process; and other such benefits.

Some embodiments provide vehicle systems that enable the mobile distribution of products. In some embodiments the vehicle system comprises: a housing; a wheel system comprising at least one axle extending between at least two wheels positioned on opposite sides of the housing and supporting the housing; a mobile product distribution system comprising: a product movement system maintained within the housing; and multiple bay doors formed in the housing and with which inbound vehicles and outbound vehicles align while products are distributed from each of the inbound vehicles to at least one of the outbound vehicles; wherein the product movement system extends between the multiple bay doors and is configured transport the products from each of the inbound vehicles, through the housing and to at least one of the outbound vehicles.

Further, some embodiments provide methods of distributing products between vehicles. Some of these methods comprise: causing a mobile product distribution system to be transported via a wheel system of the mobile product distribution system to a selected first temporary distribution location; providing each of multiple inbound vehicles and multiple outbound vehicles with access to align with one of multiple bay doors formed in a housing of the mobile product distribution system and with which inbound vehicles and outbound vehicles align; and distributing products from each of the inbound vehicles to at least one of the outbound vehicles while aligned with one of the multiple bay doors, wherein the distributing the products comprises transporting the products through the housing by a product movement system within the housing and extending between the multiple bay doors from each of the inbound vehicles to at least one of the outbound vehicles.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A vehicle system, comprising:
    a housing;
    a wheel system comprising at least one axle extending between at least two wheels positioned on opposite sides of the housing and supporting the housing;
    a mobile product distribution system comprising:
        a product movement system maintained within the housing;
        a pallet transport system;
        multiple bay doors formed in the housing and with which inbound vehicles and outbound vehicles align while products are distributed from each of the inbound vehicles to at least one of the outbound vehicles; and
        a control circuit cooperated with the housing and configured to: estimate arrival times of each of the inbound vehicles and the outbound vehicles based on respective distances the inbound vehicles and the outbound vehicles are from a temporary distribution location of multiple different temporary distribution locations, historical travel times, and other stops a correspond one of the inbound vehicles and the outbound vehicles are scheduled to make; receive identifiers of each of the inbound vehicles and the outbound vehicles currently aligned with one of the multiple bay doors; generate a distribution plan identifying a number of each product to be moved from each of the inbound vehicles and a number of each product to be moved into each of the outbound vehicles based on the estimated arrival times and the identifiers of each of the inbound vehicles and the outbound vehicles currently aligned with one of the multiple bay doors; and determine product distribution routing to be applied by at least by the product movement system based on the distribution plan;
    wherein the product movement system extends between the multiple bay doors and the control circuit directs the control of the product movement system to cause the transport of the products by the product movement system from each of the inbound vehicles, through the housing and to at least one of the outbound vehicles;
    wherein the product movement system comprises a conveyor system extending through the housing, wherein the conveyor system comprising multiple conveyors over which at least some of the products are supported as the products are moved along at least a first conveyor of the multiple conveyors comprises an array of rollers that allow products to roll along a length of the at least one conveyor and provides at least a portion of a conveyor path between two bay doors and along which products are rolled along the array of rollers and transported from a first inbound vehicle of the inbound vehicles to a first outbound vehicle of the outbound vehicles; and wherein the first conveyor is retractable and movable to be moved away from a first bay door to open space of the floor of the housing between at least the first bay door and a second bay door to enable movement of the pallet transport system to cooperate with and transport at least a pallet loaded with products from the first inbound vehicle to the first outbound vehicle.

2. The vehicle system of claim 1, wherein the multiple bay doors are arranged in the housing enabling at least the first inbound vehicle to align with the first bay door of the multiple bay doors while at least the first outbound vehicle is simultaneously aligned with the second bay door of the multiple bay doors and a second outbound vehicle is simultaneously aligned with a third bay door of the multiple bay doors;

wherein the product movement system is configured to extend from the first bay door to each of the second bay door and the third bay door and is configured to transport the products from the first inbound vehicle to the first outbound vehicle and the second outbound vehicle.

3. The vehicle system of claim 1, wherein the product movement system comprises:

an automated routing system comprising:

a conveyor system controller communicatively coupled with the control circuit to receive the product distribution routing;

at least one scanner system configured to detect a product identifier of a product traveling along the first conveyor of the conveyor system and communicate the product identifier to the conveyor system controller, wherein the conveyor system controller is configured to identify an intended outbound vehicle and a corresponding one of the multiple bay doors where the intended outbound vehicle is located; and a plurality of motorized product routers positioned to move relative to conveyors of the conveyor system and controlled to move, based on instructions from the conveyor system controller generated in accordance with and in implementing the product distribution routing, to direct the identified product as the identified product rolls along a second array of rollers of a second conveyor of the multiple conveyors onto a third conveyor and toward the corresponding one of the multiple bay doors and the intended outbound vehicle.

4. The vehicle system of claim 3, wherein the conveyor system controller is configured to communicate instructions to control the motorized product router to simultaneously direct each of multiple distinct and separate products, based on the product identifier of each of the products, from multiple of the inbound vehicles each aligned with one of the multiple bay doors to one of multiple of the outbound vehicles each aligned with one of the multiple bay doors while the multiple inbound vehicles are aligned with one of the multiple bay doors.

5. The vehicle system of claim 1, further comprising:

a wireless transceiver; and wherein the control circuit of the mobile product distribution system couples with the wireless transceiver to receive the inbound vehicle identifiers for each inbound vehicle that is within a first threshold distance of the mobile product distribution system, and the outbound vehicle identifiers for each outbound vehicle that is within a second threshold distance of the mobile product distribution system, wherein the control circuit schedules when each of the inbound vehicles and the outbound vehicles is to align with one of the multiple bay doors, and communicates a notification to each of the inbound vehicles and the outbound vehicles specifying timing of when each of the inbound vehicles and the outbound vehicles is to align with one of the multiple bay doors and specifies a bay door identifier with which each of the inbound vehicles and the outbound vehicles is to align.

6. The vehicle system of claim 1, wherein the mobile product distribution system further comprises:

a loading ramp associated with the first bay door of the multiple bay doors and configured to extend between the mobile product distribution system to cooperate with the first inbound vehicle to support the pallet transport system and the at least the pallet loaded with the products while the products are transferred by the pallet transport system at least from the first inbound vehicle; and a height control system that enables adjustment of a height of at least a portion of the mobile product distribution system in allowing alignment with at least one of the inbound vehicles and the outbound vehicles.

7. The vehicle system of claim 1, further comprising:

a scheduling control circuit; and memory storing computer instructions that when executed by the scheduling control circuit cause the scheduling control circuit to:

obtain, for each of the multiple inbound vehicles, a source location from which a corresponding one of the multiple of inbound vehicles is to transport at least one product of multiple products;

obtain multiple destination locations scheduled to receive at least one of the multiple products and to which at least one of the multiple outbound vehicles is to travel;

select a first temporary distribution location of the multiple different temporary distribution locations as a function of the multiple destination locations and at least one of the source locations; and communicate instructions to cause the mobile product distribution system to be transported to the selected first temporary distribution location.

8. The vehicle system of claim 1, wherein the first conveyor comprises a plurality of hinges and is expandable and movable, and wherein the first conveyor is configured to be moved to align with and expanded to extend into a corresponding one of the inbound vehicles or outbound vehicles that is aligned with the first bay door with which the first conveyor is aligned.

9. A method of distributing products between vehicles, comprising:

causing a mobile product distribution system to be transported via a wheel system of the mobile product distribution system to a selected first temporary distribution location;

providing each of multiple inbound vehicles and multiple outbound vehicles with access to align with one of multiple bay doors formed in a housing of the mobile product distribution system and with which inbound vehicles and outbound vehicles align;

estimating arrival times of each of the inbound vehicles and the outbound vehicles based on respective distances the inbound vehicles and the outbound vehicles are from a temporary distribution location of multiple different temporary distribution locations, historical travel times, and other stops a correspond one of the inbound vehicles and the outbound vehicles are scheduled to make;

receiving, at a control circuit of the mobile product distribution system cooperated with the housing, identifiers of each of the multiple inbound vehicles and the multiple outbound vehicles currently aligned with one of the multiple bay doors;

generating, through the control circuit, a distribution plan identifying a number of each product to be moved from each of the multiple inbound vehicles aligned with one of the bay doors and a number of each product to be moved into each of the multiple outbound vehicles aligned with one of the bay doors based on the estimated arrival times and the identifiers of each of the inbound vehicles and the outbound vehicles currently aligned with one of the multiple bay doors;

distributing products from each of the inbound vehicles to at least one of the outbound vehicles while aligned with one of the multiple bay doors directing the control of the product movement system causing the transporting of the products through the housing by a product movement system within the housing and extending between the multiple bay doors from each of the inbound vehicles to at least one of the outbound vehicles wherein the product movement system comprises a conveyor system extending through the housing and comprising multiple conveyors over which at least some of the products are supported as the products are moved along at least a first conveyor of the multiple conveyors comprising an array of rollers that allow products to roll along a length of the at least one conveyor and provides at least a portion of a conveyor path between two bay doors and along which products are rolled along the array of rollers and transported from a first inbound vehicle of the inbound vehicles to a first outbound vehicle of the outbound vehicles; and causing the first conveyor to be retracted and moved away from a first bay door to open space of the floor of the housing between at least the first bay door and a second bay door to enable movement of a pallet transport system to cooperate with and transport at least a pallet loaded with products from the first inbound vehicle to the first outbound vehicle.

10. The method of claim 9, wherein the providing the multiple inbound vehicles and the multiple outbound vehicles with access to align with one of the multiple bay doors comprises enabling at least the first inbound vehicle to align with the first bay door of the multiple bay doors while at least the first outbound vehicle is simultaneously aligned with the second bay door of the multiple bay doors and a second outbound vehicle is simultaneously aligned with a third bay door of the multiple bay doors; and wherein the distributing the products comprises transporting the products along the product movement system extending from the first bay door to each of the second bay door and the third bay door from the first inbound vehicle to the first outbound vehicle and the second outbound vehicle.

11. The method of claim 9, further comprising:
receiving a product identifier of each product traveling along the first conveyor of the conveyor system;

identifying, for each of the products, an intended outbound vehicle and a corresponding one of the bay doors where the intended outbound vehicle is located; and controlling at least one of a plurality of motorized product routers positioned to move relative to conveyors of the conveyor system to move, based on the identification of the bay door where the corresponding outbound delivery vehicle is located and implementing the product distribution routing, and directing each of the identified products as the identified products roll along a second array of rollers of a second conveyor of the multiple conveyors onto a third conveyor and toward the corresponding one of the bay doors and the intended outbound vehicle.

12. The method of claim 11, wherein the controlling the plurality of motorized product routers comprises communicating instructions to control the motorized product routers and simultaneously directing each of multiple distinct and separate products, based on the product identifier of each of the products, from the multiple inbound vehicles each aligned with one of the multiple bay doors to one of the multiple outbound vehicles each aligned with one of the multiple bay doors while the multiple inbound vehicles are aligned with one of the multiple bay doors.

13. The method of claim 9, further comprising:
wirelessly receiving the inbound vehicle identifiers for each inbound vehicle that is within a first threshold distance of the mobile product distribution system;

wirelessly receiving the outbound vehicle identifiers for each outbound vehicle that is within a second threshold distance of the mobile product distribution system;

scheduling, through the control circuit of the mobile product distribution system, when each of the inbound vehicles and the outbound vehicles is to align with one of the multiple bay doors; and communicating a notification to each of the inbound vehicles and the outbound vehicles specifying timing of when each of the inbound vehicles and the outbound vehicles is to align with one of the multiple bay doors, and specifying a bay door identifier with which each of the inbound vehicles and the outbound vehicles is to align.

14. The method of claim 9, further comprising:
extending a loading ramp configured to extend between the mobile product distribution system to cooperate with the first inbound vehicle to support the pallet transport system and the at least the pallet loaded with the products while the products are transferred by the pallet transport system at least from the first inbound vehicle; and activating a height control system and adjusting a height of at least a portion of the mobile product distribution system in aligning with at least one of the multiple inbound vehicles and the multiple outbound vehicles.

15. The method of claim 9, further comprising:
identifying, by a scheduling control circuit of a mobile product distribution system scheduling system, a source location of each of the multiple inbound vehicles from which a corresponding one of the multiple inbound vehicles is to transport at least one product of multiple products;

identifying multiple destination locations to receive at least one of the multiple products and to which at least one of the multiple outbound vehicles is to travel;

selecting the first temporary distribution location of multiple different predefined temporary distribution locations where the mobile product distribution system is to be temporarily positioned to enable products to be distributed from the multiple inbound vehicles to the multiple outbound vehicles, wherein the selecting the first temporary distribution location comprises selecting the first temporary distribution location as a function of the multiple destination locations and at least one of the source locations; and wherein the causing the mobile product distribution system to be transported comprises communicating instructions to cause the mobile product distribution system to be transported to the selected first temporary distribution location.

\* \* \* \* \*